(12) United States Patent
Du et al.

(10) Patent No.: US 12,093,083 B2
(45) Date of Patent: Sep. 17, 2024

(54) ELECTRONIC DEVICE AND CONTROL METHOD THEREOF

(71) Applicant: VIVO MOBILE COMMUNICATION CO., LTD., Guangdong (CN)

(72) Inventors: Xianhe Du, Guangdong (CN); Fen Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 255 days.

(21) Appl. No.: 17/734,428

(22) Filed: May 2, 2022

(65) Prior Publication Data

US 2022/0253106 A1 Aug. 11, 2022

Related U.S. Application Data

(63) Continuation of application No. PCT/CN2020/127053, filed on Nov. 6, 2020.

(30) Foreign Application Priority Data

Nov. 7, 2019 (CN) .......................... 201911083549.0

(51) Int. Cl.
*G06F 1/16* (2006.01)
*G09G 3/00* (2006.01)

(52) U.S. Cl.
CPC .......... *G06F 1/1652* (2013.01); *G06F 1/1677* (2013.01); *G09G 3/035* (2020.08); *G09G 2300/04* (2013.01); *G09G 2320/028* (2013.01); *G09G 2320/068* (2013.01)

(58) Field of Classification Search
CPC . H04M 1/0266; H04M 1/0268; G06F 1/1677; G06F 1/1652; G06F 1/1626; G06F 1/1637; G09F 9/301; G09G 3/035; G09G 2320/068; G09G 2380/02; G09G 2300/04; G09G 2320/028
See application file for complete search history.

(56) References Cited

U.S. PATENT DOCUMENTS

| 2013/0207946 A1* | 8/2013 | Kim | G09G 3/03 345/204 |
| 2014/0004906 A1* | 1/2014 | Chi | G06F 3/016 455/566 |
| 2014/0111549 A1* | 4/2014 | Vanska | G06F 1/1652 345/656 |

(Continued)

FOREIGN PATENT DOCUMENTS

| CN | 104714699 A | 6/2015 |
| CN | 104955285 A | 9/2015 |

(Continued)

*Primary Examiner* — Doon Y Chow
(74) *Attorney, Agent, or Firm* — Price Heneveld, LLP

(57) ABSTRACT

An electronic device and a control method thereof are provided. The electronic device includes: a screen (100), where the screen (100) includes a bendable flexible screen portion (110); and a cam (200), where the cam (200) is provided on a back side of the flexible screen portion (110) and is configured to support the flexible screen portion (110), and the cam (200) is able to rotate between a first state and a second state; in a case that the cam (200) is in the first state, the flexible screen portion (110) is curved; and in a case that the cam (200) is in the second state, the flexible screen portion (110) is flat.

19 Claims, 6 Drawing Sheets

(56) References Cited

U.S. PATENT DOCUMENTS

| | | |
|---|---|---|
| 2015/0277854 A1 | 10/2015 | Zhang |
| 2016/0143131 A1* | 5/2016 | Ahn .................... H05K 1/028 |
| | | 361/749 |
| 2017/0003716 A1* | 1/2017 | Chong ................. G06F 1/1677 |
| 2017/0094039 A1 | 3/2017 | Lu |
| 2017/0285688 A1 | 10/2017 | Sun |
| 2019/0261520 A1* | 8/2019 | Wang .................... G06F 1/1601 |
| 2020/0209925 A1* | 7/2020 | Paek .................... H10K 77/111 |
| 2021/0119171 A1* | 4/2021 | Kim ..................... H10K 59/87 |
| 2021/0357030 A1 | 11/2021 | Wang et al. |
| 2023/0384825 A1* | 11/2023 | Connor ................ G04G 17/083 |
| 2024/0004425 A1* | 1/2024 | Liu ..................... G06F 1/1652 |

FOREIGN PATENT DOCUMENTS

| | | |
|---|---|---|
| CN | 106527728 | * 3/2017 |
| CN | 106527728 A | 3/2017 |
| CN | 107657895 A | 2/2018 |
| CN | 208092594 U | 11/2018 |
| CN | 108983986 A | 12/2018 |
| CN | 109981839 A | 7/2019 |
| CN | 110211496 A | 9/2019 |
| CN | 209373965 U | 9/2019 |
| CN | 110928364 A | 3/2020 |
| EP | 2674807 A1 | 12/2013 |
| EP | 2892045 A1 | 7/2015 |

* cited by examiner

ELECTRONIC DEVICE AND CONTROL METHOD THEREOF

CROSS-REFERENCE TO RELATED APPLICATIONS

The present application is a bypass continuation application of International Application No. PCT/CN2020/127053 filed on Nov. 6, 2020, which claims priority to Chinese Patent Application No. 201911083549.0, filed in China on Nov. 7, 2019, which are incorporated herein by reference in their entireties.

TECHNICAL FIELD

The present invention relates to the field of electronic technologies, and in particular, to an electronic device and a control method thereof.

BACKGROUND

As the design of electronic devices with screens such as smart phones and tablet computers are constantly improved, people's aesthetics for such electronic devices are also changing. To adapt to people's aesthetic demands, new screen designs, such as curved screens and waterfall screens, are constantly proposed for electronic devices to improve display effects of their screens.

Although curved screens, including waterfall screens, can provide users with a good visual display and a good hand feel, when users use electronic devices with curved screens such as waterfall screens, what is displayed on the curved part of the screen is often not directly accessible for users due to the curvature of the screen and the propagation of light along a straight line. Particularly in full-screen operation scenarios such as playing games or watching full-screen movies on curved screens, the curved structure often results in users not seeing screen information at the edges of the screen or having edge reflection problems. In addition, in the full-screen operation scenario, some operations need to be triggered by the curved part of the screen, which leads to inconvenient function triggering or easily leads to mistouch.

SUMMARY

The present invention provides an electronic device and a control method thereof.

According to a first aspect, an embodiment of the present invention provides an electronic device, including:
a screen includes a bendable flexible screen portion; and
a cam is provided on a back side of the flexible screen portion and is configured to support the flexible screen portion, and the cam is able to rotate between a first state and a second state;
in a case that the cam is in the first state, the flexible screen portion is curved; and
in a case that the cam is in the second state, the flexible screen portion is flat.

According to a second aspect, an embodiment of the present invention provides a control method of electronic device, applied to the electronic device provided in the first aspect, the method includes:
receiving a screen adjustment instruction; and
controlling, according to the screen adjustment instruction, a cam to rotate between a first state and a second state.

According to a third aspect, an embodiment of the present invention provides a control method of electronic device, applied to the electronic device provided in the first aspect, the method includes:
receiving a screen adjustment operation by a user; and
controlling, in response to the screen adjustment operation, a cam to rotate between a first state and a second state.

According to a fourth aspect, an embodiment of the present invention provides an electronic device, the electronic device is the electronic device provided in the first aspect, and the electronic device includes:
a first receiving module, configured to receive a screen adjustment instruction; and
a first control module, configured to control, according to the screen adjustment instruction, a cam to rotate between a first state and a second state.

According to a fifth aspect, an embodiment of the present invention provides an electronic device, the electronic device is the electronic device provided in the first aspect, and the electronic device includes:
a second receiving module, configured to receive a screen adjustment operation by a user; and
a second control module, configured to control, in response to the screen adjustment operation, a cam to rotate between a first state and a second state.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the to-be-resolved technical problems, technical solutions, and advantages of the present invention clearer, the following provides detailed descriptions with reference to the accompanying drawings and specific embodiments.

Referring to FIGS. 1 to 6, an embodiment of the present invention provides an electronic device, including: a screen 100 and a cam 200.

The screen 100 includes a bendable flexible screen portion 110. The cam 200 is provided on a back side of the flexible screen portion 110 and is configured to support the flexible screen portion 110, and the cam 200 is able to rotate between a first state and a second state.

Figure 1:
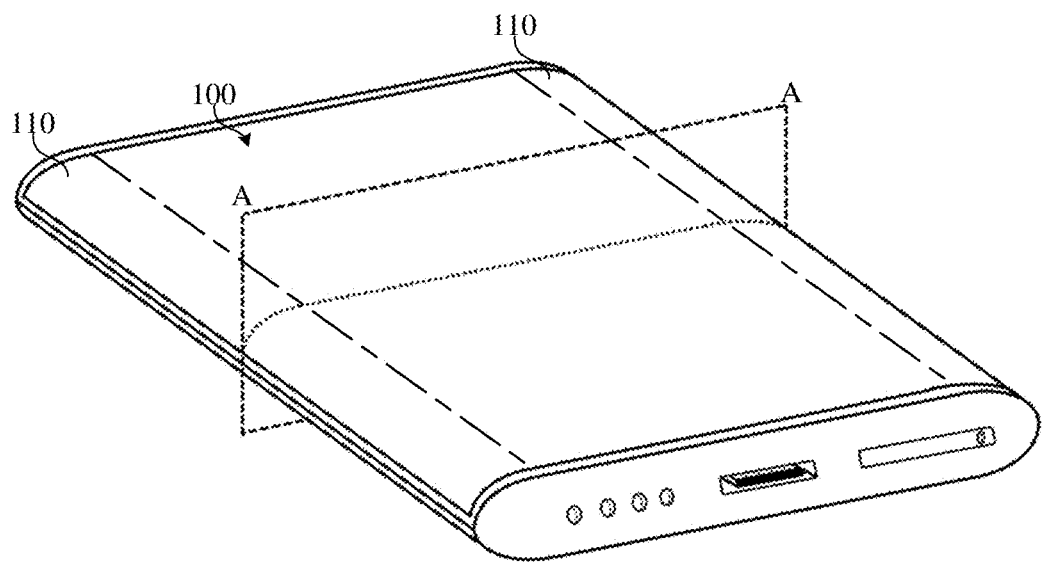
FIG. 1 is a schematic structural diagram of an electronic device when a cam is in a first state according to an embodiment of the present invention.
Figure 2:
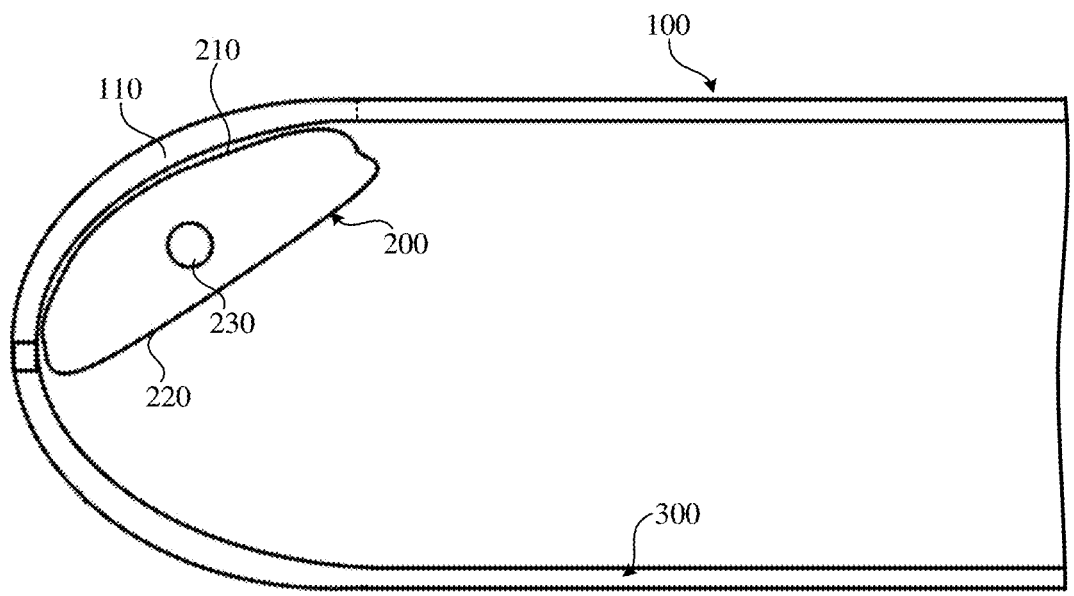
FIG. 2 is a partial cross-sectional view of an A-A cross-section of the electronic device shown in FIG. 1.
Figure 3:
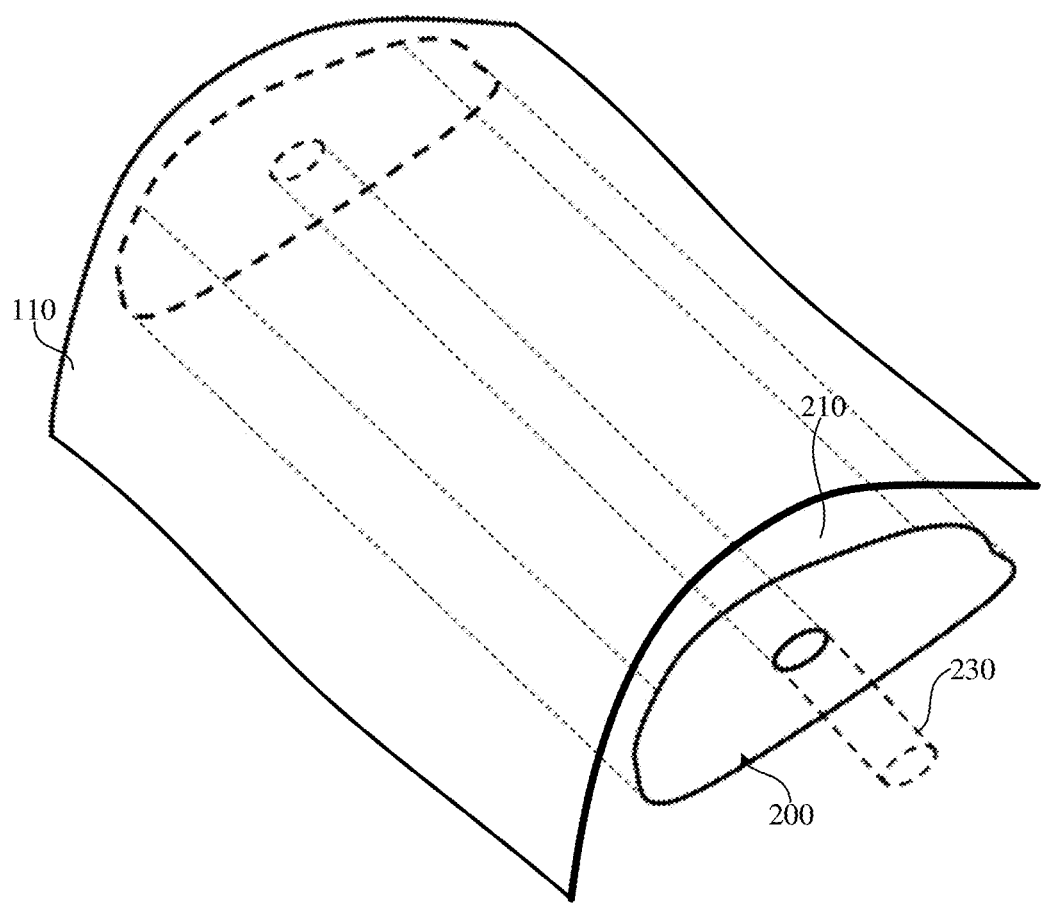
FIG. 3 is a schematic partial view of a cam in a first state according to an embodiment of the present invention.
Figure 4:
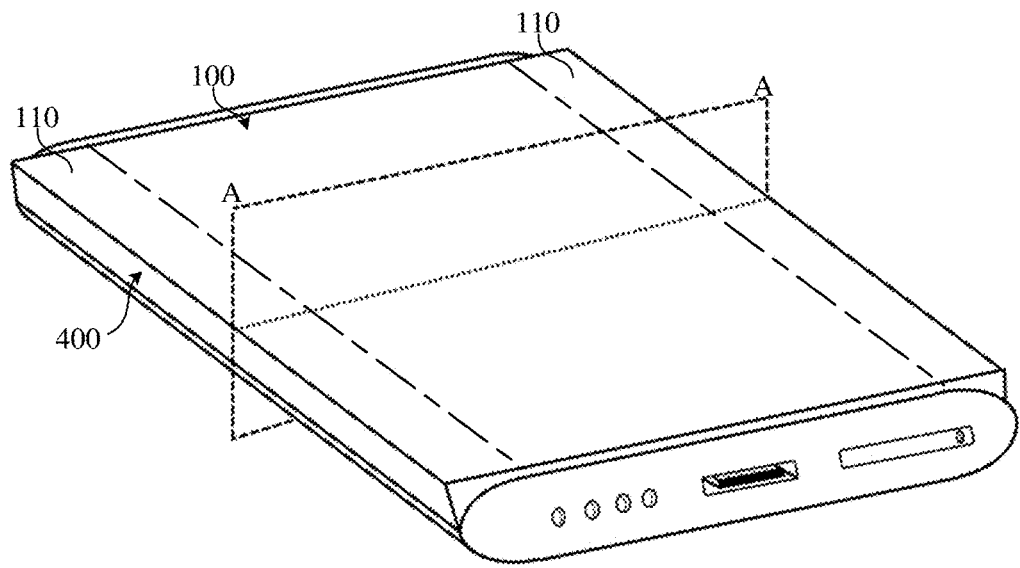
FIG. 4 is a schematic structural diagram of an electronic device when a cam is in a second state according to an embodiment of the present invention.
Figure 5:
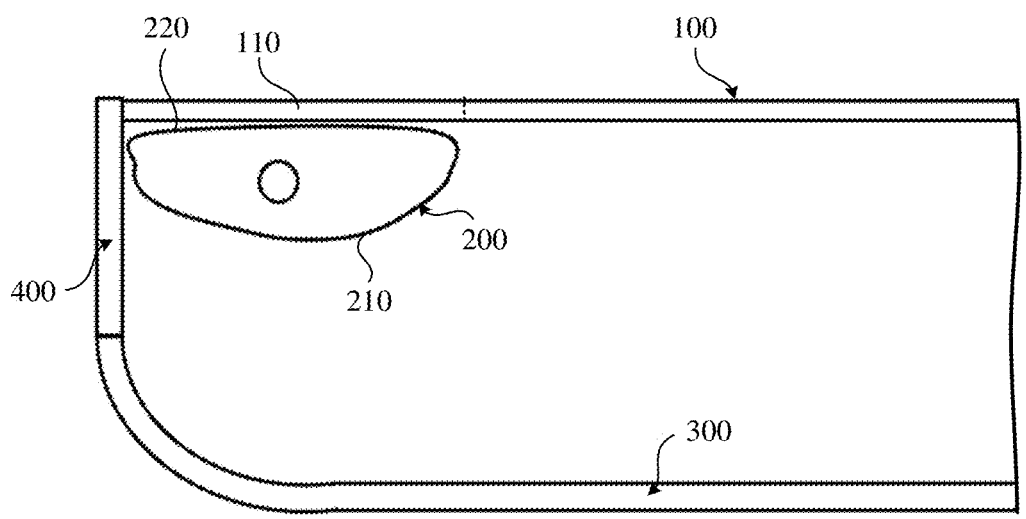
FIG. 5 is a partial cross-sectional view of an A-A cross-section of the electronic device shown in FIG. 4.
Figure 6:
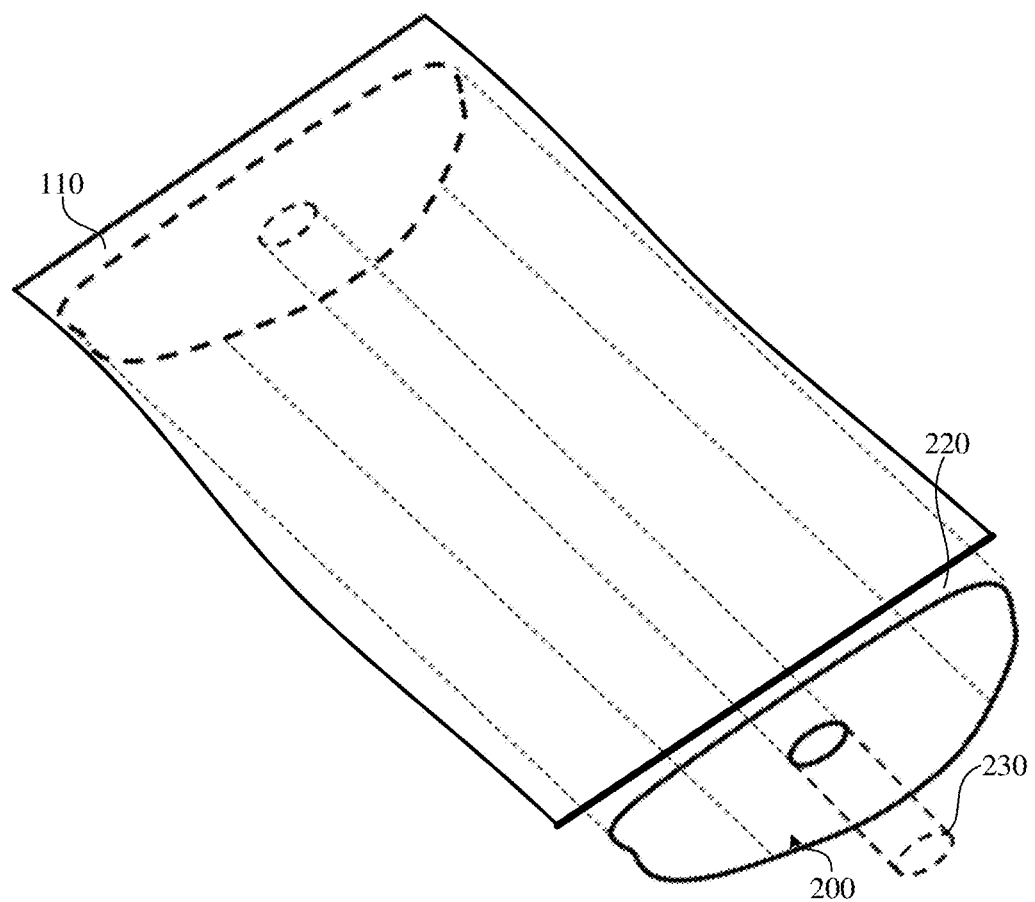
FIG. 6 is a schematic partial view of a cam in a second state according to an embodiment of the present invention.

As shown in FIG. 1 and FIG. 2, in a case that the cam 200 is in the first state, the flexible screen portion 110 is curved. As shown in FIG. 4 and FIG. 5, in a case that the cam 200 is in the second state, the flexible screen portion 110 is flat.

In this embodiment of the present invention, the cam 200 is configured to support the flexible screen portion 110, and the cam 200 rotates between the first state and the second state, so that the flexible screen portion 110 can change to be a curved screen or a flat screen. In other words, a screen state of the flexible screen portion 110 can be adjusted through change of a state of the cam 200. In a case that the cam 200 is in the second state, the flexible screen portion 110 may be arranged flush with other portions of the screen connected to the flexible screen portion 110 (as shown in FIG. 4 and FIG. 5), or may be arranged in tilt. The flexible screen portion 110 is made flat by changing the cam 200 to the second state, allowing a user to view display content on that portion easily. In addition, the flat flexible screen portion 110 allows the user to trigger a function conveniently and avoids accidental or inconvenient trigger. In the embodiments of the present invention, the flexible screen portion 110 may be curved at a preset curvature. For example, the preset curvature may be Gaussian curvature.

It can be understood that in a case that the flexible screen portion 110 is unfolded and is flat, because of its own rigidity and the support provided by the cam 200 for the flexible screen portion 110, the flexible screen portion 110 allows touch control operations such as a tap or touch, without affecting use of a screen function.

In the embodiments of the present invention, the flexible screen portion 110 may be a structure spliced with the screen 100, or may be a portion integrally formed with the screen 100. A surface, facing outside of the electronic device and used to display picture, of the flexible screen portion 110 is a front side, a surface facing inside of the electronic device is a back side, and the front side of the flexible screen portion 110 and the back side of the flexible screen portion 110 are oppositely disposed.

In this embodiment of the present invention, the cam 200 is disposed on the back side of the flexible screen portion 110 and supports the flexible screen portion 110. In a case that the cam 200 is in the first state, the flexible screen portion 110 is curved; in a case that the cam 200 is in the second state, the flexible screen portion 110 is flat. In other words, a state of the cam 200 can be changed based on a specific usage demand of the electronic device to adjust a screen state of the flexible screen portion 110, so as to satisfy usage demands of different usage environments and users.

In this embodiment of the present invention, based on different screen design demands and usage demands, in a case that the cam 200 is in the first state, the curved flexible screen portion 110 may be in different forms, that is, a cross-section of the flexible screen portion 110 may be in different arc states. For example, in some optional embodiments of the present invention, the flexible screen portion 110 is located at an edge of the screen 100. And in a case that the cam 200 is in the first state, the cross-section of the flexible screen portion 110 is an arc protruding toward the front side. In this way, in a case that the cam 200 is in the first state, the flexible screen portion 110 is fit for grip. Certainly, based on design demands, in a case that the cam 200 is in the first state, the cross-section of the flexible screen portion 110 may alternatively be an arc recessing toward the back side.

Optionally, in some embodiments of the present invention, as shown in FIG. 2, FIG. 3, FIG. 5, and FIG. 6, an outer contour surface of the cam 200 includes a first contour surface 210 and a second contour surface 220 smoothly connected to the first contour surface 210, where the first contour surface 210 is curved, and the second contour surface 220 is flat. As shown in FIG. 2, in a case that the cam 200 is in the first state, the first contour surface 210 is attached to the back side of the flexible screen portion 110, so that the flexible screen portion 110 is curved. As shown in FIG. 5, in a case that the cam 200 is in the second state, the second contour surface 220 is attached to the back side of the flexible screen portion 110, so that the flexible screen portion 110 is flat. In the embodiments of the present invention, different contour surfaces of the cam 200 are attached to the back side of the flexible screen portion 110, to support the flexible screen portion 110 and keep the flexible screen portion 110 curved or flat. A rotation shaft 230 is disposed on the cam 200, and the cam 200 is driven to rotate by the rotation shaft 230, so that the cam 200 can rotate between the first state and the second state and stay in the first state or the second state. In one example, the first contour surface 210 and the second contour surface 220 are two opposite contour surfaces on the cam 200.

In some optional embodiments of the present invention, the electronic device may further include a driving member. The driving member is connected to the rotation shaft 230 of the cam 200, and the driving member drives the cam 200 to rotate between the first state and the second state. The driving member is configured to provide power for the rotation shaft 230 of the cam 200, so as to drive the rotation shaft 230 to rotate, and the rotation shaft 230 drives the cam 200 to rotate between the first state and the second state and stay in the first state or the second state.

In the embodiments of the present invention, at least one cam 200 may be provided. For example, a plurality of cams 200 are provided, rotation shafts of the plurality of cams 200 are collinear, and the plurality of cams 200 rotate synchronously. In this way, the plurality of cams 200 are configured to support the flexible screen portion 110, to provide greater support for the flexible screen portion 110, and increase a rotation torque for the flexible screen portion 110 to change between a curved screen state and a flat screen state. Preferably, the plurality of cams 200 may be evenly distributed.

Optionally, in some embodiments of the present invention, as shown in FIG. 2 and FIG. 5, the flexible screen portion 110 is connected to a back connector 300, and the back connector 300 may be a cover plate or a back screen. Herein, the back connector 300 may be disposed opposite to the back of the screen 100. When a user is using the electronic device, the back connector 300 supports and provides placement support for the electronic device, and protects internal components of the electronic device. It can be understood that if the back connector 300 is a back screen, the back screen may be in a structure the same as or different from that of the screen 100.

Optionally, in some embodiments of the present invention, as shown in FIG. 2 and FIG. 4 (a folding member 400 is not marked in FIG. 2), the electronic device further includes the folding member 400. The folding member 400 is connected between the flexible screen portion 110 and the back connector 300. In a case that the cam 200 is in the first state, the folding member 400 is folded inward, so that the flexible screen portion 110 is curved, fits for grip, and looks good. In a case that the cam 200 is in the second state, the folding member 400 is unfolded, so that the flexible screen portion 110 is flat. The folding member 400 provides structural support for the flexible screen portion 110 with its structural rigidity.

Preferably, in some embodiments of the present invention, to ensure an integrally formed structure of the electronic device and provide dustproof protection for the internal components of the electronic device, the folding member 400 may include at least two folding pages. The at least two folding pages may include a first folding page and a second folding page, meaning that the folding member 400 may include the first folding page and the second folding page. One end of the first folding page is flexibly connected to an edge of the flexible screen portion 110; and one end of the second folding page is rotatably connected to the other end of the first folding page, and the other end of the second folding page is flexibly connected to an edge of the back connector 300. Herein, one end of the first folding page being flexibly connected to the edge of the flexible screen portion 110 means that one end of the first folding page is deformably connected to at least one of edges of the flexible screen portion 110, to allow the one end of the first folding page to be integrally joined with the edge of the flexible screen portion 110, making the electronic device fit for grip and look good. Similarly, one end of the second folding page being flexibly connected to an edge of the back connector 300 means that one end of the second folding page is deformably connected to at least one of edges of the back connector 300, to allow the one end of the second folding page to be integrally joined with the edge of the back connector 300, making the electronic device fit for grip and look good.

In addition, in some optional embodiments of the present invention, the electronic device may further include a control button. The control button is provided on the folding member 400. Part of the control button may be embedded into the folding member 400 or protrude from the folding member 400. In this way, in a case that the cam 200 is in the first state, the folding member 400 is folded inward, and the control button is hidden; and in a case that the cam 200 is in the second state, the folding member 400 is unfolded. And the control button is in a touchable state or exposed outside the electronic device, allowing the user to perform an operation through the button when the flexible screen portion 110 is in a flat screen state. Herein, the control button may be arranged in a plurality of forms. For example, the control button may be a physical button such as a mechanical button or an electronic button. For another example, the control button may be a touch button such as a resistive touch button or a capacitive sensing button.

In addition, in the embodiments of the present invention, the flexible screen portion 110 may be provided in plurality, each of the flexible screen portions 110 is located at the edge of the screen 100, and each of the flexible screen portions 110 is supported by the cam 200. For example, two flexible screen portions 110 may be provided and are located at two opposite edges of the screen 100. For another example, four flexible screen portions 110 may be provided and are respectively located at four edges of the screen 100.

In addition, in this embodiment of the present invention, the electronic device may be a mobile phone or a tablet computer. It can be understood that the electronic device is not limited to the mobile phone or the tablet computer, and may also be an electronic device with a screen display function, such as a laptop computer or a personal digital assistant (PDA).

The electronic device provided in the embodiments of the present invention can change a state of a cam based on a specific usage demand of the electronic device, to adjust a screen state of a flexible screen portion, thereby satisfying usage demands of different usage environments and users, and avoiding problems of inconvenience of viewing the displayed content, reflection of light on a curved surface, function mistouch, and inconvenient function triggering which are problems with a single-state curved surface structure.

Figure 7:
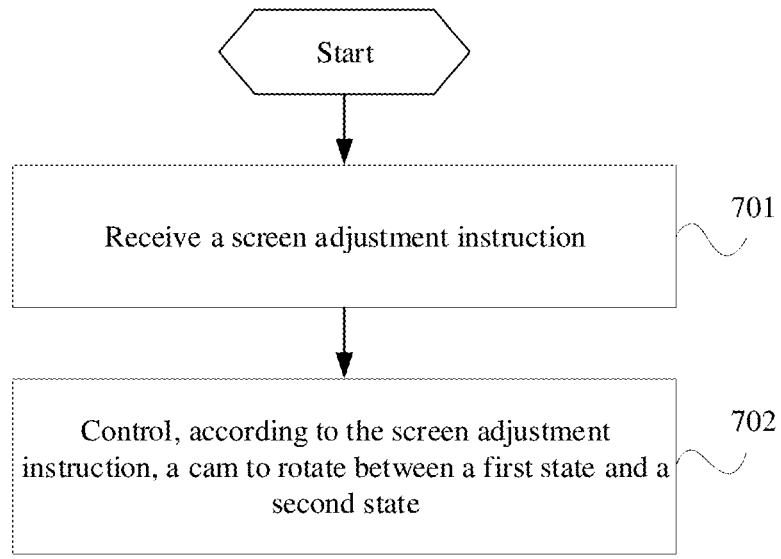
FIG. 7 is a first schematic flowchart of a control method of electronic device according to an embodiment of the present invention.

Referring to FIG. 7, FIG. 7 is a first schematic flowchart of a control method of electronic device according to an embodiment of the present invention. This embodiment of the present invention provides a control method of electronic device, applied to the foregoing electronic device, and the method may include the following steps.

Step 701: Receive a screen adjustment instruction.

Step 702: Control, according to the screen adjustment instruction, a cam to rotate between a first state and a second state.

In this embodiment of the present invention, the electronic device monitors for and receives the screen adjustment instruction for adjusting a screen. In a case that the screen adjustment instruction is received, the electronic device rotates the cam to change a state according to the screen adjustment instruction, that is, rotate from the first state to the second state or rotate from the second state to the first state, so as to adjust a screen state of a flexible screen portion of the screen, so that the flexible screen portion changes from a curved screen state to a flat screen state, or from a flat screen state to a curved screen state. In this way, the screen state of the flexible screen portion can be adjusted based on a specific usage scenario of the electronic device, to satisfy usage demands of different usage scenarios, and avoid problems of inconvenience of viewing the displayed content, reflection of light on a curved surface, function mistouch, and inconvenient function triggering which are problems with a single-state curved surface structure.

Optionally, in some embodiments of the present invention, the step 702 of controlling, according to the screen adjustment instruction, a cam to rotate between a first state and a second state may include the following steps: comparing the screen adjustment instruction with preset adjustment instructions; controlling, in a case that the screen adjustment instruction matches a first preset adjustment instruction, the cam to rotate from the first state to the second state; and controlling, in a case that the screen adjustment instruction matches a second preset adjustment instruction, the cam to rotate from the second state to the first state; where the first preset adjustment instruction is used for rotating the cam from the first state to the second state, and the second preset adjustment instruction is used for rotating the cam from the second state to the first state. In this embodiment of the present invention, the preset adjustment instructions used for controlling state change of the cam have been set in advance, and the preset adjustment instructions include the first preset adjustment instruction and the second preset adjustment instruction. Herein, after receiving the screen adjustment instruction, the electronic device compares the screen adjustment instruction with the preset adjustment instructions, to determine rotation control for the cam corresponding to the screen adjustment instruction, so as to implement accurate control.

Optionally, in the embodiments of the present invention, whether to receive the screen adjustment instruction may be determined based on a usage state of the screen. For example, when it is detected that the screen is in a full-screen display mode or the screen is currently displaying a preset game scenario, the electronic device determines that the screen adjustment instruction is received and that the screen adjustment instruction matches the first preset adjustment instruction; and when it is detected that the screen exits the full-screen display mode or the screen exits the preset game scenario, the electronic device determines that the screen adjustment instruction is received and that the screen adjustment instruction matches the second preset adjustment instruction. Certainly, in the embodiments of the present invention, a corresponding screen adjustment instruction may also be received based on a user input operation. For example, in the case that a first input for the flexible screen portion is received from a user, the electronic device may determine that the screen adjustment instruction is received and that the screen adjustment instruction matches the first preset adjustment instruction; and in a case that a second input for the flexible screen portion is received from a user, the electronic device may determine that the screen adjustment instruction is received and that the screen adjustment instruction matches the second preset adjustment instruction.

Optionally, in some embodiments of the present invention, in order to improve experience of human-computer interaction, the method may further include the following step: sending a preset alert according to the screen adjustment instruction. This helps enhance personalization and fun of usage, and improve user experience. Herein, the preset alert may include at least one of prompt methods such as a vibration prompt, a preset sound prompt, and a preset light prompt. In the embodiments of the present invention, after receiving the screen adjustment instruction, the electronic device may send the preset alert according to the screen adjustment instruction in at least one of the following opportunities: before the cam starts state change, after the state change finishes, and during the state change. For example, the preset alert may include a first dynamic prompt and a second dynamic prompt. In the process of controlling the cam to rotate from the first state to the second state, the electronic device sends the first dynamic prompt; and in the process of controlling the cam to rotate from the second state to the first state, the electronic device sends the second dynamic prompt. Herein, the first dynamic prompt and the second dynamic prompt may be different or the same.

According to the control method of the electronic device provided in this embodiment of the present invention, the screen adjustment instruction is received; and the cam is controlled, according to the screen adjustment instruction, to rotate between the first state and the second state. In this way, the screen state of the flexible screen portion can be adjusted based on a specific usage scenario of the electronic device, to satisfy usage demands of different usage scenarios, and avoid problems of inconvenience of viewing the displayed content, reflection of light on a curved surface, function mistouch, and inconvenient function triggering which are problems with a single-state curved surface structure.

Figure 8:
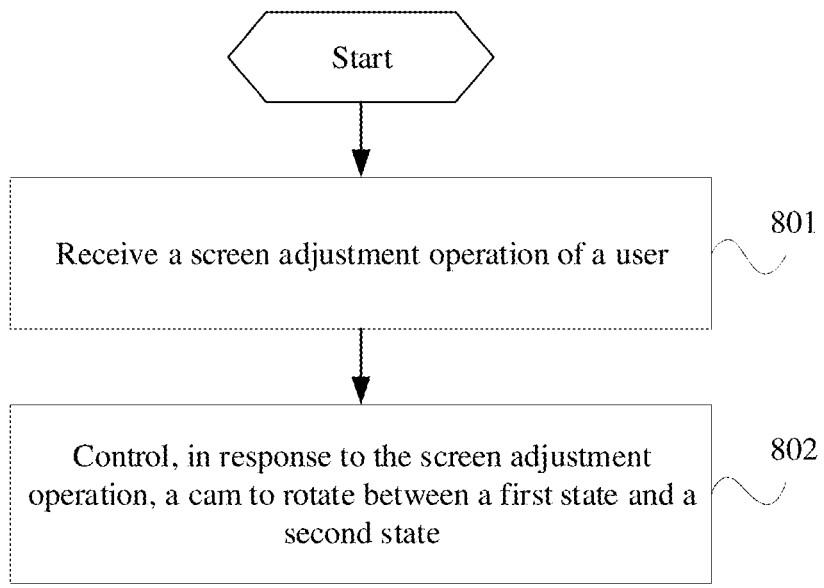
FIG. 8 is a second schematic flowchart of a control method of electronic device according to an embodiment of the present invention.

Referring to FIG. 8, FIG. 8 is a second schematic flowchart of a control method of electronic device according to an embodiment of the present invention. This embodiment of the present invention provides a control method of electronic device, applied to the foregoing electronic device, and the method may include the following steps.

Step 801: Receive a screen adjustment operation by a user.

Step 802: Control, in response to the screen adjustment operation, a cam to rotate between a first state and a second state.

Herein, the screen adjustment operation may be at least one of a preset voice input operation, a touch input operation for the electronic device, a body movement input operation, and a motion input operation for the electronic device. Herein, the touch input operation for the electronic device may include but is not limited to a touch input operation for a screen or a housing, the body movement input operation may include but is not limited to a gesture movement input operation, a head movement input operation, a facial movement input operation, and the like, and the motion input operation for the electronic device may include but is not limited to a swing movement input operation, a flip movement input operation, and the like for the electronic device.

In this embodiment of the present invention, in a case that the user needs to adjust a flexible screen portion of a screen, the user may perform a screen adjustment operation, so that the electronic device receives the screen adjustment operation, and in response to the operation, rotates the cam to change a state, that is, rotate from the first state to the second state or from the second state to the first state, to adjust a screen state of the flexible screen portion of the screen, so that flexible screen portion changes from a curved screen state to a flat screen state, or from a flat screen state to a curved screen state. In this way, the screen state of the flexible screen portion can be adjusted based on a screen usage demand of the user, to satisfy different usage demands of different users, and avoid problems of inconvenient viewing of display content, reflection of light on a curved surface, and accidental or inconvenient trigger caused by the monotonous curved structure.

In the embodiments of the present invention, different operation inputs may be used for the screen adjustment operation of controlling the cam to rotate from the first state to the second state and the screen adjustment operation of controlling the cam to rotate from the second state to the first state, to improve operation personalization; or the same operation input may be used, to simplify user operations.

For example, in some optional embodiments of the present invention, the step 802 of controlling, in response to the screen adjustment operation, a cam to rotate between a first state and a second state may include the following steps: in a case that the flexible screen portion is curved, controlling, in response to the screen adjustment operation, the cam to rotate from the first state to the second state; and in a case that the flexible screen portion is flat, controlling, in response to the screen adjustment operation, the cam to rotate from the second state to the first state.

Optionally, in some embodiments of the present invention, to improve experience of human-computer interaction, the method may further include the following step: sending a preset alert according to the screen adjustment operation. This helps enhance personalization and fun of usage, and improve user experience. Herein, the preset alert may include at least one of prompt methods such as a vibration prompt, a preset sound prompt, and a preset light prompt. In this embodiment of the present invention, after receiving the screen adjustment operation, the electronic device may send the preset alert in response to the screen adjustment operation in at least one of the following opportunities: before the cam starts state change, after the state change finishes, and during the state change. For example, the preset alert may include a first dynamic prompt and a second dynamic prompt. In the process of controlling the cam to rotate from the first state to the second state, the electronic device sends the first dynamic prompt; and in the process of controlling the cam to rotate from the second state to the first state, the electronic device sends the second dynamic prompt. Herein, the first dynamic prompt and the second dynamic prompt may be different or the same.

According to the control method of the electronic device provided in this embodiment of the present invention, the screen adjustment operation of the user is received; and in response to the screen adjustment operation, the cam is controlled to rotate between the first state and the second state. The screen state of the flexible screen portion can be adjusted based on a screen usage demand of the user, to satisfy different usage demands of different users, and avoid problems of inconvenience of viewing the displayed content, reflection of light on a curved surface, function mistouch, and inconvenient function triggering which are problems with a single-state curved surface structure.

Based on the foregoing method applied to the electronic device, the embodiments of the present invention provide an electronic device used for implementing the foregoing methods.

Figure 9:
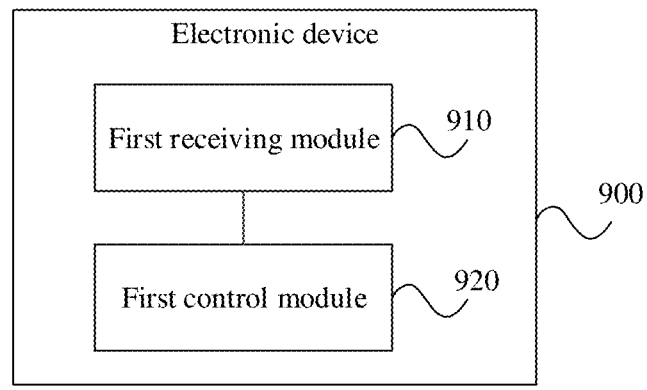
FIG. 9 is a first structural block diagram of an electronic device according to an embodiment of the present invention.

Referring to FIG. 9, FIG. 9 is a first structural block diagram of an electronic device according to an embodiment of the present invention. This embodiment of the present invention provides an electronic device 900. The electronic device 900 is the foregoing electronic device, and the electronic device 900 may include a first receiving module 910 and a first control module 920.

The first receiving module 910 is configured to receive a screen adjustment instruction; and the first control module 920 is configured to control, according to the screen adjustment instruction, a cam to rotate between a first state and a second state.

Optionally, in some embodiments of the present invention, the first control module 920 may include a comparison unit, a first control unit, and a second control unit.

The comparison unit is configured to compare the screen adjustment instruction with preset adjustment instructions;

the first control unit is configured to control, in a case that the screen adjustment instruction matches a first preset adjustment instruction, the cam to rotate from the first state to the second state; and the second control unit is configured to control, in a case that the screen adjustment instruction matches a second preset adjustment instruction, the cam to rotate from the second state to the first state; where the first preset adjustment instruction is used for rotating the cam from the first state to the second state, and the second preset adjustment instruction is used for rotating the cam from the second state to the first state.

Optionally, in some embodiments of the present invention, the electronic device 900 may further include a first alert module.

The first alert module is configured to send a preset alert according to the screen adjustment instruction.

The preset alert may include at least one of prompt methods such as a vibration prompt, a preset sound prompt, and a preset light prompt.

The electronic device provided in this embodiment of the present invention can implement the processes implemented by the electronic device in the method embodiment applied to the electronic device in FIG. 7. To avoid repetition, details are not described herein again.

In the electronic device provided in this embodiment of the present invention, the first receiving module receives the screen adjustment instruction; and the first control module controls, according to the screen adjustment instruction, the cam to rotate between the first state and the second state. In this way, a screen state of a flexible screen portion can be adjusted based on a specific usage scenario of the electronic device, to satisfy usage demands of different usage scenarios, and avoid problems of inconvenient viewing of display content, reflection of light on a curved surface, and accidental or inconvenient trigger caused by the monotonous curved structure.

Figure 10:
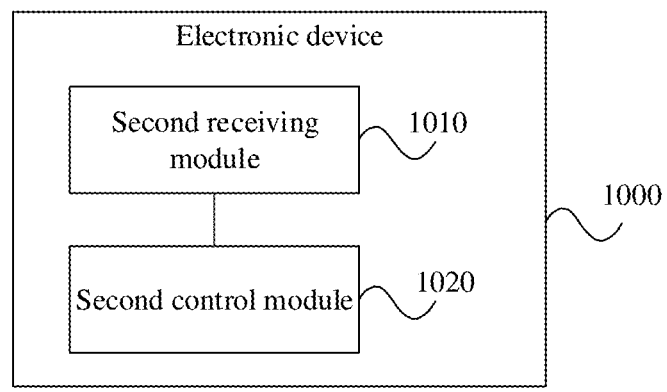
FIG. 10 is a second structural block diagram of an electronic device according to an embodiment of the present invention.

Referring to FIG. 10, FIG. 10 is a second structural block diagram of an electronic device according to an embodiment of the present invention. This embodiment of the present invention provides an electronic device 1000. The electronic device 1000 is the foregoing electronic device, and the electronic device 1000 may include a second receiving module 1010 and a second control module 1020.

The second receiving module 1010 is configured to receive a screen adjustment operation by a user; and the second control module 1020 is configured to control, in response to the screen adjustment operation, a cam to rotate between a first state and a second state.

Optionally, in some embodiments of the present invention, the second control module 1020 may include a fourth control unit and a fifth control unit.

The fourth control unit is configured to: in a case that a flexible screen portion is curved, control, in response to the screen adjustment operation, the cam to rotate from the first state to the second state; and the fifth control unit is configured to: in a case that the flexible screen portion is flat, control, in response to the screen adjustment operation, the cam to rotate from the second state to the first state.

Optionally, in some embodiments of the present invention, the electronic device 1000 may further include a second prompt module.

The second prompt module is configured to send a preset alert according to the screen adjustment operation.

The preset alert may include at least one of prompt methods such as a vibration prompt, a preset sound prompt, and a preset light prompt.

The electronic device provided in this embodiment of the present invention can implement the processes implemented by the electronic device in the method embodiment applied to the electronic device in FIG. 8. To avoid repetition, details are not described herein again.

In the electronic device provided in this embodiment of the present invention, the second receiving module receives the screen adjustment operation of the user; and the second control module controls, in response to the screen adjustment operation, the cam to rotate between the first state and the second state. In this way, a screen state of the flexible screen portion can be adjusted based on a screen usage demand of the user, to satisfy different usage demands of different users, and avoid problems of inconvenience of viewing the displayed content, reflection of light on a curved surface, function mistouch, and inconvenient function triggering which are problems with a single-state curved surface structure.

It should be understood that references to terms "an embodiment", "one embodiment", or "some embodiments" in the specification mean that specified features, structures, or characteristics related to the embodiment are included in at least one embodiment or example of the present invention. Therefore, "in an embodiment", "in one embodiment", or "in some embodiments" appearing throughout the specification does not necessarily refer to a same embodiment. In addition, elements, structures, or features described in an accompanying drawing or an embodiment of the present invention may be combined with elements, structures, or features shown in one or more other accompanying drawings or embodiments in any suitable manner.

It should be noted that in one or more embodiments of this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

In the present invention, unless otherwise specified and defined explicitly, the terms "mounted", "interconnected", "connected", "fastened", and "arranged" are to be interpreted broadly, for example, may be fixedly connected, or detachably connected, or integrated, may be mechanically connected or electrically connected, and may be directly connected or indirectly connected through an intermediate medium, or internally communicated between two elements or interacted between two elements. A person of ordinary skill in the art can understand specific meanings of these terms in the present invention based on specific situations.

In addition, the present invention may repeat reference numerals and/or letters in different embodiments or examples. This repetition is for the purpose of simplification and clarity, and does not in itself indicate any relationship between the various embodiments and/or arrangements discussed.

Moreover, in the embodiments of the present invention, relational terms such as first and second are used only to differentiate one entity or operation from another entity or operation, and do not necessarily require or imply that any actual relationship or sequence exist between these entities or operations.

The embodiments of the present invention are described above with reference to the accompanying drawings, but the present invention is not limited to the foregoing implementations. The foregoing implementations are only illustrative rather than restrictive. Inspired by the present invention, a person of ordinary skill in the art can still derive many variations without departing from the essence of the present invention and the protection scope of the claims. All these variations shall fall within the protection of the present invention.

What is claimed is:

1. An electronic device, comprising:
   a screen comprising a bendable flexible screen portion; and
   a cam provided on a back side of the flexible screen portion and configured to support the flexible screen portion, wherein the cam is able to rotate between a first state and a second state;
   in a case that the cam is in the first state, the flexible screen portion is curved; and
   in a case that the cam is in the second state, the flexible screen portion is flat,
   wherein an outer contour surface of the cam comprises a first contour surface and a second contour surface smoothly connected to the first contour surface, wherein the first contour surface is curved, and the second contour surface is flat;
   in a case that the cam is in the first state, the first contour surface is attached to the back side of the flexible screen portion, so that the flexible screen portion is curved; and
   in a case that the cam is in the second state, the second contour surface is attached to the back side of the flexible screen portion, so that the flexible screen portion is flat.

2. The electronic device according to claim 1, wherein the flexible screen portion is located at an edge of the screen, and in a case that the cam is in the first state, a cross-section of the flexible screen portion is an arc protruding toward a front side.

3. The electronic device according to claim 2, wherein the flexible screen portion is provided in plurality, each of the flexible screen portions is located at an edge of the screen, and each of the flexible screen portions is supported by the cam.

4. The electronic device according to claim 1, further comprising:
   a driving member connected to a rotation shaft of the cam, wherein the cam is driven by the driving member to rotate between the first state and the second state.

5. The electronic device according to claim 4, wherein the flexible screen portion is provided in plurality, each of the flexible screen portions is located at an edge of the screen, and each of the flexible screen portions is supported by the cam.

6. The electronic device according to claim 1, wherein a plurality of cams are provided, rotation shafts of the plurality of cams are collinear, and the plurality of cams rotate synchronously.

7. The electronic device according to claim 6, wherein the flexible screen portion is provided in plurality, each of the flexible screen portions is located at an edge of the screen, and each of the flexible screen portions is supported by the cam.

8. The electronic device according to claim 1, wherein the flexible screen portion is connected to a back connector, and the back connector is a cover plate or a back screen.

9. The electronic device according to claim 8, further comprising:
   a folding member connected between the flexible screen portion and the back connector; wherein
   in a case that the cam is in the first state, the folding member is folded inward, so that the flexible screen portion is curved; and
   in a case that the cam is in the second state, the folding member is unfolded, so that the flexible screen portion is flat.

10. The electronic device according to claim 9, wherein the folding member comprises:
    a first folding page, wherein one end of the first folding page is flexibly connected to an edge of the flexible screen portion; and
    a second folding page, wherein one end of the second folding page is rotatably connected to the other end of the first folding page, and the other end of the second folding page is flexibly connected to an edge of the back connector.

11. The electronic device according to claim 9, wherein the flexible screen portion is provided in plurality, each of the flexible screen portions is located at an edge of the screen, and each of the flexible screen portions is supported by the cam.

12. The electronic device according to claim 8, wherein the flexible screen portion is provided in plurality, each of the flexible screen portions is located at an edge of the screen, and each of the flexible screen portions is supported by the cam.

13. The electronic device according to claim 1, wherein the flexible screen portion is provided in plurality, each of the flexible screen portions is located at an edge of the screen, and each of the flexible screen portions is supported by the cam.

14. The electronic device according to claim 1, wherein the flexible screen portion is provided in plurality, each of the flexible screen portions is located at an edge of the screen, and each of the flexible screen portions is supported by the cam.

15. A control method of electronic device, the electronic device comprising a screen comprising a bendable flexible screen portion; and a cam provided on a back side of the flexible screen portion and configured to support the flexible screen portion, wherein the cam is able to rotate between a first state and a second state; in a case that the cam is in the first state, the flexible screen portion is curved; and in a case that the cam is in the second state, the flexible screen portion is flat, wherein an outer contour surface of the cam comprises a first contour surface and a second contour surface smoothly connected to the first contour surface, wherein the first contour surface is curved, and the second contour surface is flat; in a case that the cam is in the first state, the first contour surface is attached to the back side of the flexible screen portion, so that the flexible screen portion is curved; and in a case that the cam is in the second state, the second contour surface is attached to the back side of the flexible screen portion, so that the flexible screen portion is flat, wherein the method comprises:
  receiving a screen adjustment instruction; and
  controlling the cam to rotate between the first state and the second state, according to the screen adjustment instruction.

16. The method according to claim 15, wherein the controlling the cam to rotate between the first state and the second state, according to the screen adjustment instruction, comprises:
  comparing the screen adjustment instruction with preset adjustment instructions;
  in a case that the screen adjustment instruction matches a first preset adjustment instruction, controlling the cam to rotate from the first state to the second state; and
  in a case that the screen adjustment instruction matches a second preset adjustment instruction, controlling the cam to rotate from the second state to the first state; wherein
  the first preset adjustment instruction is used for rotating the cam from the first state to the second state, and the second preset adjustment instruction is used for rotating the cam from the second state to the first state.

17. The method according to claim 15, further comprising:
  sending a preset alert according to the screen adjustment instruction.

18. A control method of electronic device, the electronic device comprising a screen comprising a bendable flexible screen portion; and a cam provided on a back side of the flexible screen portion and configured to support the flexible screen portion, wherein the cam is able to rotate between a first state and a second state; in a case that the cam is in the first state, the flexible screen portion is curved; and in a case that the cam is in the second state, the flexible screen portion is flat, wherein an outer contour surface of the cam comprises a first contour surface and a second contour surface smoothly connected to the first contour surface, wherein the first contour surface is curved, and the second contour surface is flat; in a case that the cam is in the first state, the first contour surface is attached to the back side of the flexible screen portion, so that the flexible screen portion is curved; and in a case that the cam is in the second state, the second contour surface is attached to the back side of the flexible screen portion, so that the flexible screen portion is flat, wherein the method comprises:
  receiving a screen adjustment operation by a user; and
  controlling the cam to rotate between the first state and the second state in response to the screen adjustment operation.

19. The method according to claim 18, wherein the controlling the cam to rotate between the first state and the second state in response to the screen adjustment operation, comprises:
  in a case that a flexible screen portion is curved, controlling the cam to rotate from the first state to the second state in response to the screen adjustment operation; and
  in a case that the flexible screen portion is flat, controlling the cam to rotate from the second state to the first state in response to the screen adjustment operation.

* * * * *